United States Patent
Ozawa

(10) Patent No.: US 7,426,587 B2
(45) Date of Patent: Sep. 16, 2008

(54) SEMICONDUCTOR INTEGRATED CIRCUIT

(75) Inventor: Kazumasa Ozawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 145 days.

(21) Appl. No.: 11/029,485

(22) Filed: Jan. 6, 2005

(65) Prior Publication Data

US 2005/0125587 A1 Jun. 9, 2005

Related U.S. Application Data

(62) Division of application No. 10/173,677, filed on Jun. 19, 2002.

(30) Foreign Application Priority Data

Jun. 28, 2001 (JP) .............................. 2001-196320

(51) Int. Cl.
*G06F 3/00* (2006.01)
(52) U.S. Cl. .............................. 710/8; 710/306; 710/313
(58) Field of Classification Search ..................... 710/8, 710/9, 15, 16, 18, 305, 306, 313, 316, 317, 710/110; 713/321–324
See application file for complete search history.

(56) References Cited

U.S. PATENT DOCUMENTS

| | | | |
|---|---|---|---|
| 5,535,349 A | | 7/1996 | Boaz et al. |
| 5,872,940 A | | 2/1999 | Circello et al. |
| 5,978,860 A | * | 11/1999 | Chan et al. ..................... 710/8 |
| 6,081,863 A | * | 6/2000 | Kelley et al. ................. 710/312 |
| 6,115,823 A | | 9/2000 | Velasco et al. |
| 6,163,817 A | * | 12/2000 | Shteyn et al. .................. 710/8 |
| 6,260,094 B1 | * | 7/2001 | Davis et al. ................. 710/314 |
| 6,353,867 B1 | | 3/2002 | Qureshi et al. |
| 6,567,882 B1 | * | 5/2003 | Onagawa ..................... 710/314 |
| 6,985,990 B2 | * | 1/2006 | Bronson et al. ............. 710/306 |
| 7,054,979 B2 | * | 5/2006 | Streitenberger et al. ..... 710/305 |

FOREIGN PATENT DOCUMENTS

| | | |
|---|---|---|
| JP | 58-182736 | 10/1983 |
| JP | 61-284891 | 12/1986 |
| JP | 05-274257 | 10/1993 |

OTHER PUBLICATIONS

Overview of the PCI Specification, PCI Local Bus, unknown date.*

* cited by examiner

*Primary Examiner*—Khanh Dang
(74) *Attorney, Agent, or Firm*—Volentine & Whitt, P.L.L.C.

(57) ABSTRACT

A semiconductor integrated circuit includes a bridge circuit which controls a data transfer of a bus line, peripheral circuits which are connected to the bridge circuit through the busline, and a control circuit which is formed at the peripheral circuits. The control circuit receives a select signal and controls the data transfer in the peripheral circuits in accordance with a logic state of the select signal.

19 Claims, 4 Drawing Sheets

SEMICONDUCTOR INTEGRATED CIRCUIT

CROSS REFERENCE TO RELATED APPLICATION

This is a divisional application of application Ser. No. 10/173,677, filed Jun. 19, 2002, which is hereby incorporated by reference in its entirety for all purposes.

The present application claims priority under 35 U.S.C. § 119 to Japanese Patent Application No. 2001-196320, filed Jun. 28, 2001, which is herein incorporated by reference in its entirely for all purposes.

BACKGROUND OF THE INVENTION

1. Field of the Invention

The present invention relates to a semiconductor integrated circuit, and more particularly to the layout of peripheral circuits which one connected to an address bus.

2. Description of the Related Art

A system large scale integrated circuit (a system LSI) is known as a conventional semiconductor integrated circuit. In a system LSI, a plurality of peripheral circuits are electrically connected to a central processing unit (CPU) through a common address bus, so as to reduce a layout area of the bus configuration in the system LSI.

In a common address bus configuration, an address signal is communicated to both an accesses peripheral circuit and non-accessed peripheral circuits. As a result, a current flows in a circuit portion of the non-accessed peripheral circuits, for example, a write resister and a read resister. Accordingly, unnecessary power consumption occurs in the non-accessed circuits.

Recently, with the enhancement of the integration level of the system LSI, the number of the peripheral circuits included in the system LSI has increased, and accordingly, the unnecessary power consumption of the non-accessed peripheral circuits has increased. Further, since the number of the peripheral circuits has increased, it is desired to reduce the layout area of the address bus on the system LSI.

SUMMARY OF THE INVENTION

In a semiconductor integrated circuit according to the present invention, a bridge circuit controls a data transfer of the bus, a plurality of peripheral circuits are connected to the bridge circuit through the bus, and a control circuit is formed in the peripheral circuits. The control circuit receives a select signal and controls the data transfer in the peripheral circuits in accordance with a logic state of the select signal.

The present invention can reduce a power consumption of a non-accessed address bus. Further, the present invention can reduce a layout area of the address bus.

The above and further objects and novel features of the invention will become more fully apparent from the following detailed description, appended claims and accompanying drawings herein.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described in detail with reference to the accompanying drawings. The drawings used for this description typically illustrate major characteristic parts to facilitate understanding of the invention.

Figure 1:
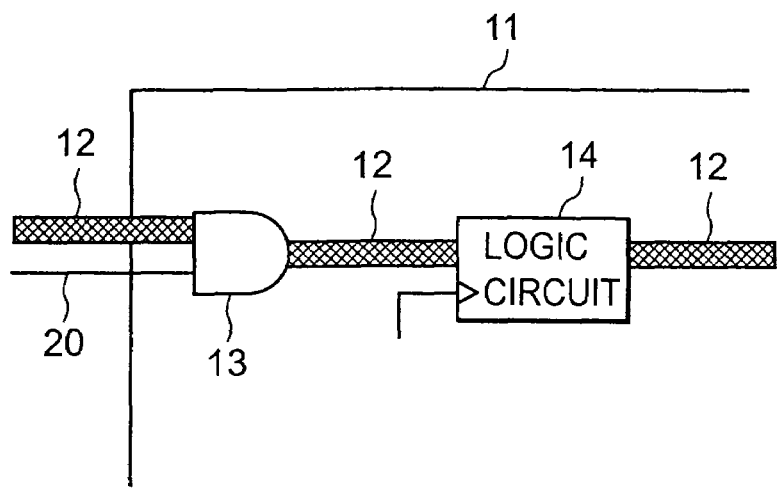
FIG. 1 is a block diagram of a semiconductor integrated circuit according to a first preferred embodiment of the present invention.

FIG. 1 is a block diagram of a semiconductor integrated circuit according to a first preferred embodiment of the present invention, and in particular, FIG. 1 shows a peripheral circuit 11. The peripheral circuit 11 includes an AND gate 13 which receives an input address signal IAS and a select signal S, and a logic circuit 14 which receives an output of the AND gate 13. The AND gate 13 has two input terminals. One of the input terminals is electrically connected to an address bus 12 and the other one is electrically connected to a select signal line 20. The AND gate 13 transfers the input address signal IAS outputted from a CPU to the logic circuit 14 as an output address signal OAS, when the select signal S is an active state. The logic circuit 14 is consisted of, for example, a write resister and a read resister.

Figure 2:
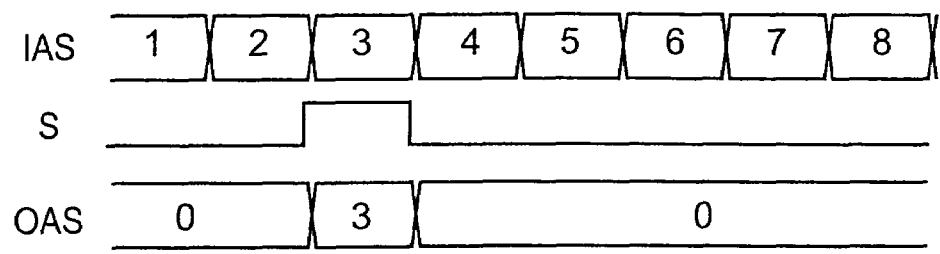
FIG. 2 is a signal timing chart of the semiconductor integrated circuit according to the first preferred embodiment of the present invention.

FIG. 2 is a signal timing chart of the semiconductor integrated circuit according to the first preferred embodiment of the present invention. Specifically, FIG. 2 shows the input address signal IAS, the select signal S and the output address signal OAS. As shown in FIG. 2, when an address of the peripheral circuit 11 is "3", the AND gate 13 receives the input address signal IAS having an address "3" which is the same as the address "3" of the peripheral circuit 11, and outputs the output address signal OAS having an address "3" to the logic circuit 14, when the select signal S is an active state. At that time, a voltage of the output address signal OAS having the address "3" is, for example, 5V.

On the other hand, the AND gate 13 outputs the output address signal OAS having an address "0" when the select signal is an inactive state. The output address signal OAS having the address "0" indicates, for example, that a voltage of all signal lines of the address bus 12 is 0V.

According to the first preferred embodiment of the present invention, since the output address signal OAS which is applied to the peripheral circuit 14 can be kept at 0V when the peripheral circuit 11 is a non-accessed state, the application of a voltage to the logic circuit 14 can be inhibited. Therefore, a power consumption of the non-accessed peripheral circuit can be reduced.

Figure 3:
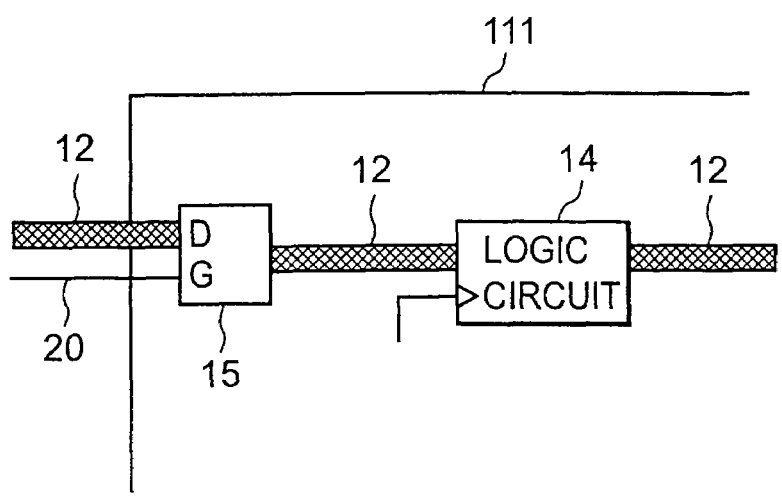
FIG. 3 is a block diagram of a semiconductor integrated circuit according to a second preferred embodiment of the present invention.

FIG. 3 is a block diagram of a semiconductor integrated circuit according to a second preferred embodiment of the present invention, and in particular, FIG. 3 shows a peripheral circuit 111. The peripheral circuit 111 includes an latch circuit 15 which receives an input address signal IAS and receives a select signal S as a gate signal, and a logic circuit 14 which receives an output of the latch circuit 15. The latch circuit 15 has a data input terminal D and a gate terminal G. The data input terminal D is electrically connected to an address bus 12, and the gate terminal G is electrically connected to a select signal line 20. The latch circuit 15 receives and holds an address of the input address signal IAS outputted from a CPU when the select signal S is an active state, and outputs the address to the logic circuit 14 as an output address signal OAS. The logic circuit 14 is consisted of, for example, a write resister and a read resister.

Figure 4:
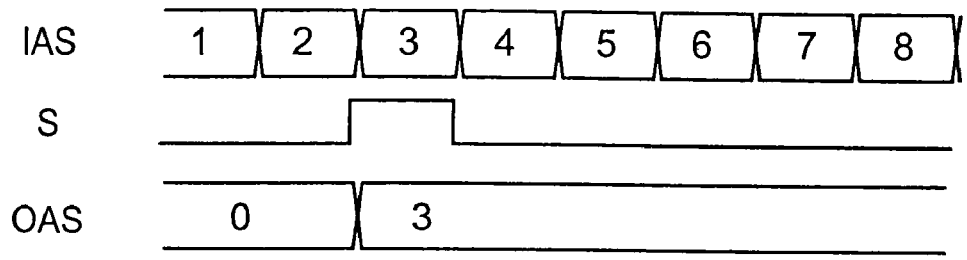
FIG. 4 is a signal timing chart of the semiconductor integrated circuit according to the second preferred embodiment of the present invention.

FIG. 4 is a signal timing chart of the semiconductor integrated circuit according to the second preferred embodiment of the present invention. Similar to the first preferred embodiment, FIG. 4 shows the input address signal IAS, the select signal S and the output address signal OAS. As shown in FIG. 4, when the address of the peripheral circuit 111 is "3", the latch circuit 15 receives and holds the input address signal IAS having the address "3" which is the same as the address "3" of the peripheral circuit 111, and continues to output the output address signal OAS having the address "3" to the logic circuit 14, after when the select signal S changes an active state. At that time, a voltage of the output address signal OAS having the address "3" is, for example, 5V.

On the other hand, the latch circuit 15 outputs the output address signal OAS having an address "0" when the select signal is an inactive state. The output address signal OAS having the address "0" indicates, for example, that a voltage of all signal lines of the address bus 12 is 0V.

According to the second preferred embodiment of the present invention, since the output address signal OAS which is applied to the peripheral circuit 14 can be held to 0V when the peripheral circuit 11 is in a non-accessed state, the application of a voltage to the logic circuit 14 can be inhibited. Therefore, power consumption of the non-accessed peripheral circuit can be reduced.

Figure 5:
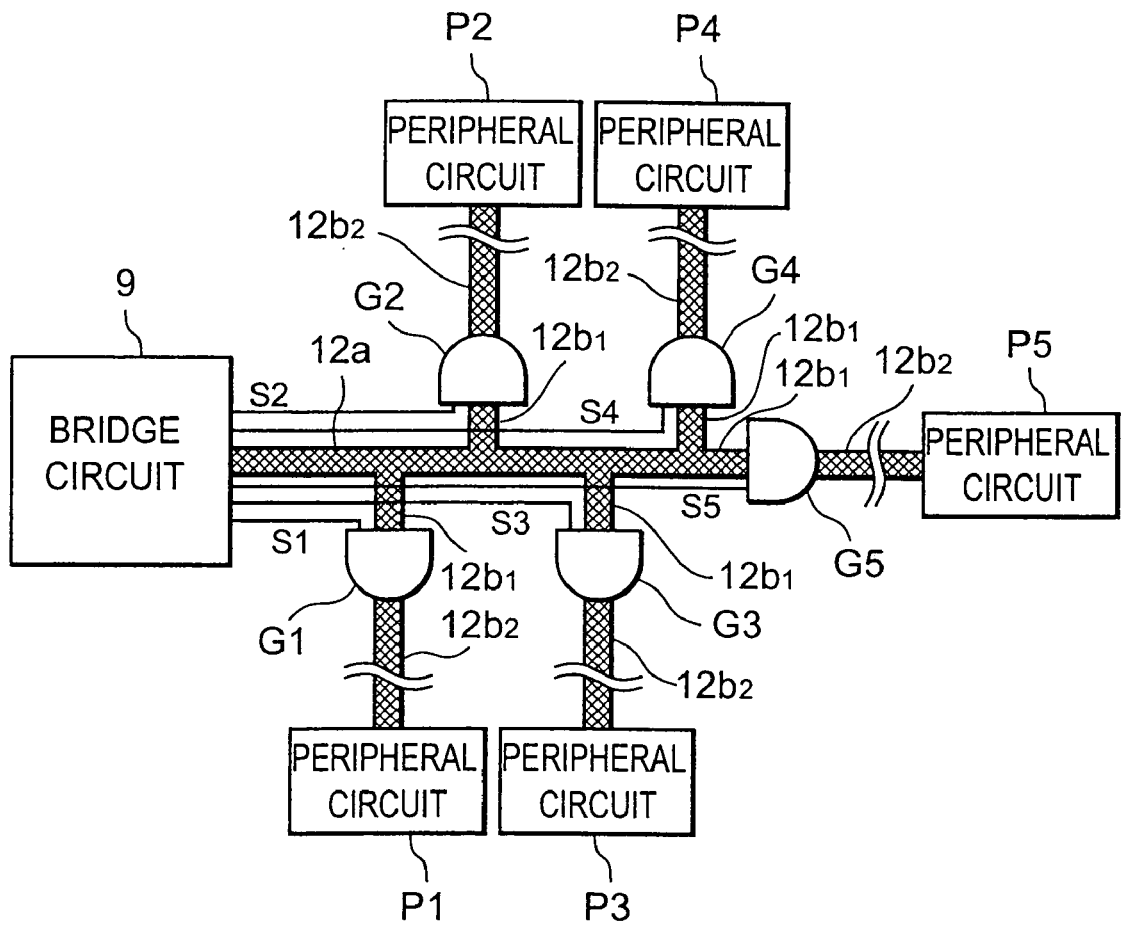
FIG. 5 is a block diagram of a semiconductor integrated circuit according to a third preferred embodiment of the present invention.

FIG. 5 is a block diagram of a semiconductor integrated circuit according to a third preferred embodiment of the present invention. In the third preferred embodiment, gates G1 through G5 are formed externally of peripheral circuits P1 through P5, while the gate (e.g., the AND gate 13 and the latch circuit 15) is formed in the peripheral circuit 11 and 111, in the first and second preferred embodiments.

As shown in FIG. 5, a main address bus 12a extending from a bridge circuit 9 branches off into five branch address buses 12b, and the five branch buses 12b are electrically connected to the five peripheral circuits P1 through P5, respectively. The gates G1 through G5 are formed at locations just after the main address bus 12a is branched off into the branch address buses 12b. Each branch address bus 12b includes sub-buses 12b1 and 12b2. The sub-bus 12b2 is longer than the sub-bus 12b1. Select signals S1 through S5 are applied to the gates G1 through G5, respectively. As a result, an opened and closed state of the gates G1 through G5 are controlled in accordance with states (active and inactive) of the select signals S1 through S5. In this way, an address signal on the main address bus 12a is not communicated to the branch address bus 12b connected to a non-accessed peripheral circuit.

According to the third preferred embodiment of the present invention, since a voltage of all signal lines of the branch address bus 12b which are not communicated with the address signal on the main address bus 12a is held to 0V, current does not flow to these signal lines. Therefore, a power consumption of the non-accessed peripheral circuits can be reduced.

Figure 6:
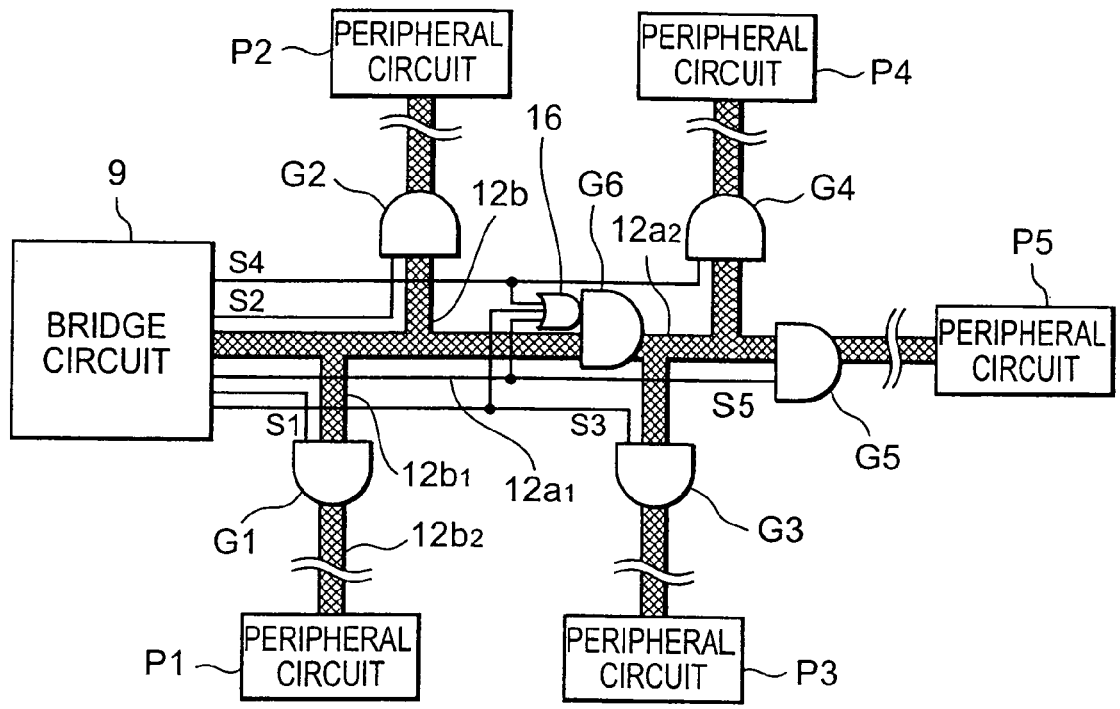
FIG. 6 is a block diagram of a semiconductor integrated circuit according to a fourth preferred embodiment of the present invention.

FIG. 6 is a block diagram of a semiconductor integrated circuit according to a fourth preferred embodiment of the present invention. As shown in FIG. 6, gates G1 through G5 are formed externally of peripheral circuits P1 through P5, and a gate G6 is formed in a main bus 12a. The gate G6 is, for example, an AND gate or a latch circuit, and transfer an address signal when an output of a select circuit 16 is an active state. The select circuit 16 is, for example, an OR gate.

The main address bus 12a extending from a bridge circuit 9 branches off into five branch address buses 12b, and the five branch buses 12b are electrically connected to the five peripheral circuits P1 through P5, respectively. The gates G1 through G5 are formed and located just after the main address bus 12a is branched off into the branch address buses 12b. The branch address bus 12b includes sub-buses 12b1 and 12b2. The sub-bus 12b2 is longer than the sub-bus 12b1. Select signals S1 through S5 are applied to the gates G1 through G5, respectively. Also, select signals S3 through S5 are applied to the select circuit 16. The select circuit 16 simply selects and outputs the select signal S3 through S5 for the peripheral circuit P3 through P5 which are located after the gate G6. As a result, the gate G6 transfers the address signal when one of the peripheral circuits P3 through P5 are accessed. However, the gate G6 does not transfer the address signal when the peripheral circuits P1 and P2 are accessed. Therefore, a voltage of all signal lines of the main address bus 12a locating at an output side of the gate G6 is fixed at 0V. The gate G6 can be controlled by an exclusive decode signal in place of the output of the select circuit 16.

According to the fourth preferred embodiment of the present invention, since the voltage of all signal lines of the main address bus 12a located at the output side of the gate G6 is fixed to 0V when the peripheral circuits P3 through P5 located at outside of the gate G6 are non-accessed, a useless current does not flow to the all signal lines of the main address bus 12a located at the output side of the gate G6. Therefore, a power consumption of the non-accessed peripheral circuits can be reduced.

Figure 7:
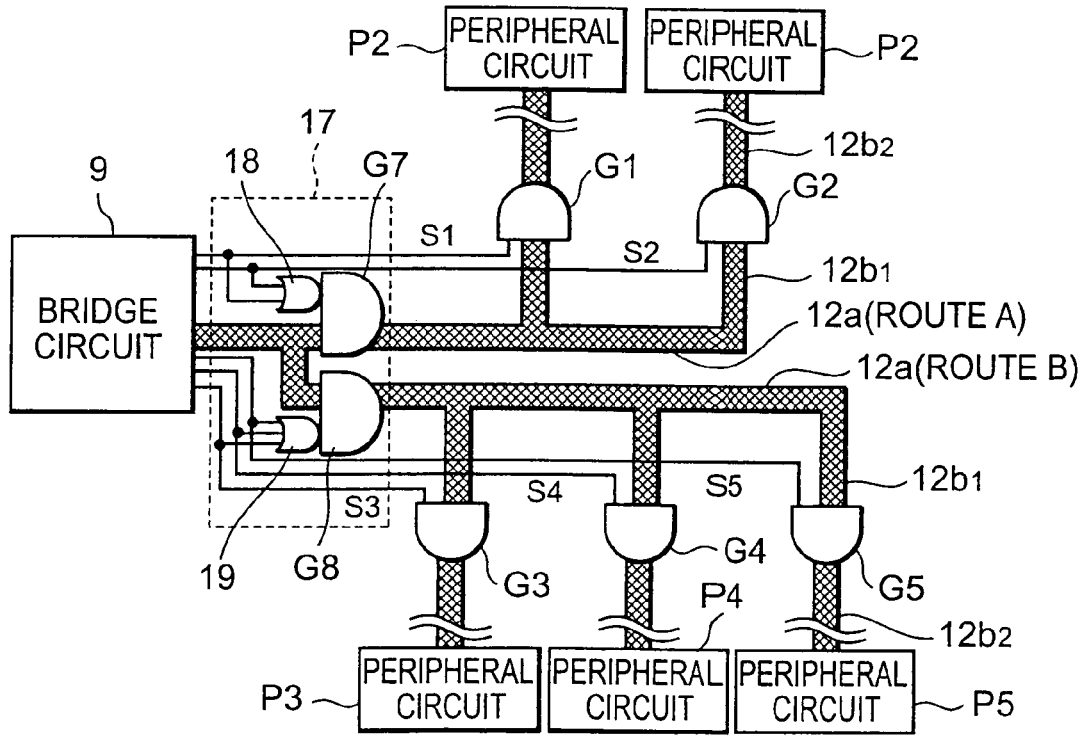
FIG. 7 is a block diagram of a semiconductor integrated circuit according to a fifth preferred embodiment of the present invention.

FIG. 7 is a block diagram of a semiconductor integrated circuit according to a fifth preferred embodiment of the present invention. As shown in FIG. 7, a main address bus 12a extending from a bridge circuit 9 is divided into two routes A and B by a distributing circuit 17. Similar to the fourth and fifth preferred embodiments, a branch address bus 12b includes sub-buses 12b1 and 12b2. The sub-bus 12b2 is longer than the sub-bus 12b1. The distributing circuit 18 includes a gate G7 which is formed on the route A, a gate G8 which is formed on the route B, a select circuit 18 which is electrically connected to an input of the gate G7, and a select circuit 19 which is electrically connected to an input of the gate G8. The gate G7 transfers an address signal when an output of the select signal 18 is an active state. The gate G8 transfers the address signal when an output of the select circuit 19 is an active.

The select circuit 18 receives select signals S1 and S2 for peripheral circuits P1 and P2 which are electrically connected to branch buses branching from the route A. Therefore, the gate G7 transfers the address signal when one of the peripheral circuits P1 and P2 is accessed. However, when the peripheral circuits P1 and P2 are non-accessed, a voltage of all signal lines of the route A is fixed at 0V.

The select circuit 19 receives select signals S3 through S5 for peripheral circuits P3 through P5 which are electrically connected to branch buses branching from the route B. Therefore, the gate G8 tarnsfers the address signal when one of the peripheral circuits P3 through P5 is accessed. However, when the peripheral circuits P3 through P5 are non-accessed, a voltage of all signal lines of the route B is fixed at 0V.

According to the fifth preferred embodiment of the present invention, since the main address bus is divided into the plurality of the routes A and B, all routes without the route leading to the accessed peripheral circuit are an inactive state. Therefore, a power consumption of the non-accessed peripheral circuits can be reduced.

Figure 8:
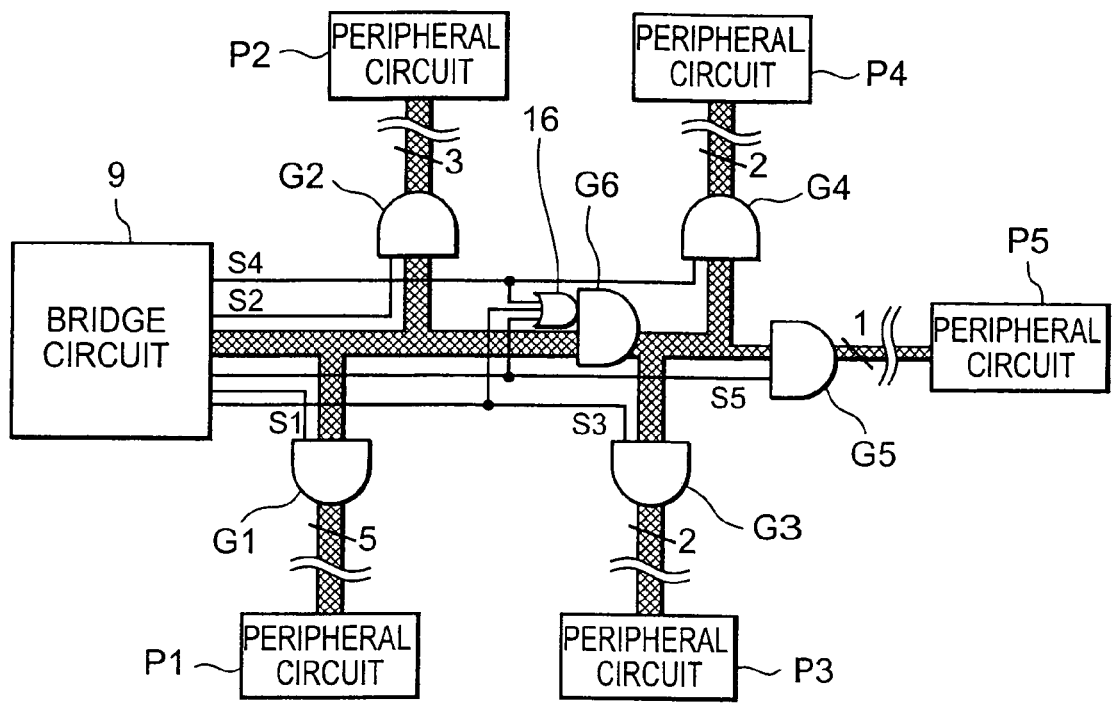
FIG. 8 is a block diagram of a semiconductor integrated circuit according to a sixth preferred embodiment of the present invention.

FIG. 8 is a block diagram of a semiconductor integrated circuit according to a sixth preferred embodiment of the present invention. Peripheral circuits P1 through P5 have various resisters. A number of signal lines of an address bus leading to the peripheral circuits P1 through P5 is decided according to a number of the resisters being subject to access. A number of signal lines of the address bus indicates a number of bits of the address bus. Specifically, when the peripheral circuit. P1 has the most resisters being subject to access, a number of bits of the address bus leading to the peripheral circuit P1 is the most. On the other hand, when the peripheral circuit P5 has the fewest resisters being subject to access, a number of bits of the address bus leading to the peripheral circuit P5 is the fewest. At that time, a number of the signal lines of the address bus indicates a width of the address bus. Therefore, when the peripheral circuit P1 has the most resisters being subject to access, the address bus leading to the peripheral circuit P1 is the widest. On the other hand, when the peripheral circuit P5 has the fewest resisters being subject to access, the address bus leading to the peripheral circuit P5 is the most narrow.

The peripheral circuit P1 is located closest to the bridge circuit 9, and the peripheral circuit P5 is located farthest from the bridge circuit 9. Therefore, a number of bits of the address bus leading to the peripheral circuit P1 is the most. On the other hand, a number of bits of the address bus leading to the peripheral circuit P5 is the fewest. A number of bits of the address bus indicates a width of the address bus. Therefore, the address bus leading to the peripheral circuit P1 is the widest. On the other hand, the address bus leading to the peripheral circuit P5 is the most narrow.

As shown in FIG. 8, the address bus leading to the peripheral circuit P1 which is located closest to a bridge circuit 9 is consisted of five signal lines. The address bus leading to a peripheral circuit P2 is consisted of three signal lines. The address buses leading to peripheral circuits P3 and P4 are consisted of two signal lines. The address bus leading to the peripheral circuit P5 which is located at the farthest from the bridge circuit 9 is consisted of one signal line.

Specifically, the address bus having five signal lines are electrically connected to a gate G1. Also, three signal lines of the address bus having five signal lines are electrically connected to a gate G2. Two signal lines of the address bus having five signal lines are electrically connected to a gate G6. The two signal lines connecting to the gate G6 are electrically connected to gates G3 and G4. One of the two signal lines connecting to the gate G6 is electrically connected to a gate G5.

According to the sixth preferred embodiment of the present invention, since a layout area of the address bus can be reduced, a power consumption of the address bus can be reduced.

Figure 9:
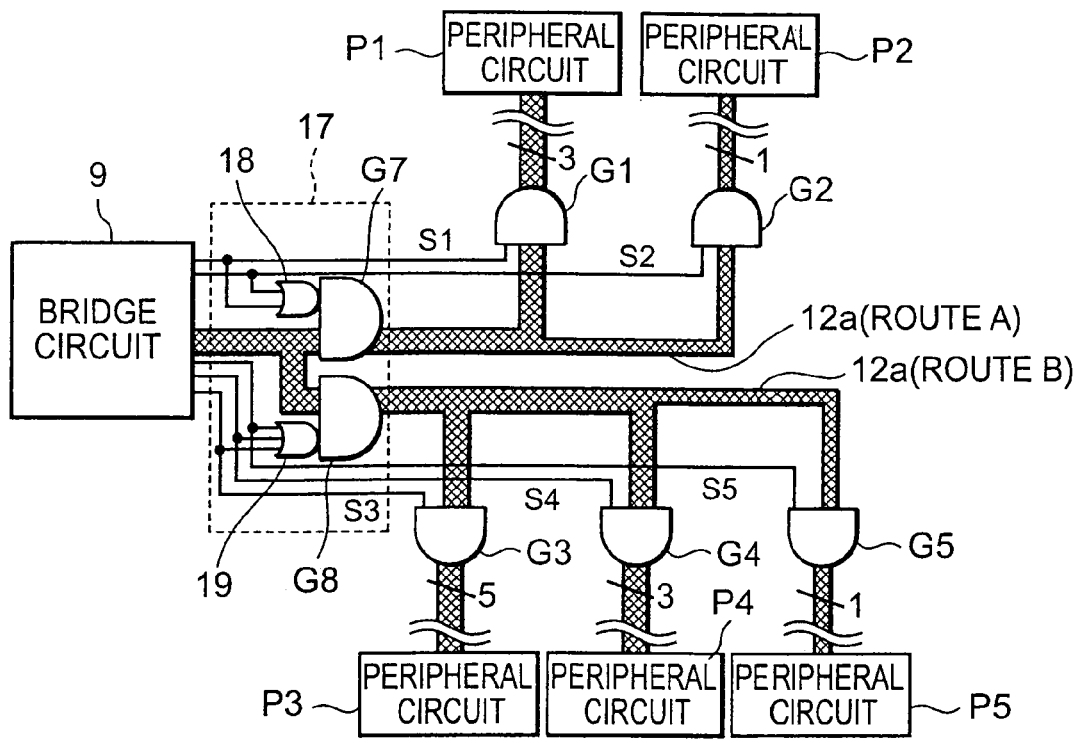
FIG. 9 is a block diagram of a semiconductor integrated circuit according to a seventh preferred embodiment of the present invention.

FIG. 9 is a block diagram of a semiconductor integrated circuit according to a seventh preferred embodiment of the present invention. As shown in FIG. 9, an address bus leading to a peripheral circuit P3 which is located closest to a bridge circuit 9 is consisted of five signal lines. The address buses leading to peripheral circuits P1 and P4 are consisted of three signal lines. In a route A, the address bus leading to the peripheral circuit P2 which is located farthest from the bridge circuit 9 is consisted of one signal line. Similarly, in a route B, the address bus leading to the peripheral circuit P5 which is located farthest from the bridge circuit 9 is consisted of one signal line. Therefore, a number of bits of the address bus leading to the peripheral circuit P3 is the most. On the other hand, in the route A, a number of bits of the address bus leading to the peripheral circuit P2 is the fewest. In the route B, a number of bits of the address bus leading to the peripheral circuit P5 is the fewest. A number of bits of the address bus indicates a width of the address bus. Therefore, the address bus leading to the peripheral circuit P3 is the widest. On the other hand, in the route A, the address bus leading to the peripheral circuit P2 is the most narrow. And, in the route B, the address bus leading to the peripheral circuit P5 is the most narrow.

Specifically, the address bus having five signal lines is electrically connected to a gate G8. Three signal lines of the address bus having five signal lines are electrically connected to a gate G7. The five signal lines connected to G8 are electrically connected to a gate G3 Three signal lines of the five signal lines connected to the gate G8 are electrically connected to gates G4. One of the five signal lines connected to the gate G8 is electrically connected to a gate G5. The three signal lines connected to the gate G7 are electrically connected to gates G1. One of the three signal lines connected to the gate G7 is electrically connected to a gate G2.

According to the seventh preferred embodiment of the present invention, since a layout area of the address bus can be reduced, a power consumption of the address bus can be reduced.

While the present invention present an example in which power consumption of the address bus is reduced, the invention is not limited to this example and may be used to reduce the power consumption of a data bus.

As described above, according to the semiconductor integrated circuit of the present invention, a power consumption of a non-accessed address bus can be reduced. Further, a layout area of the address bus can be reduced.

The present invention has been described with reference to illustrative embodiments, however, this description must not be considered to be confined only to the embodiments illustrated. Various modifications and changes of these illustrative embodiments and the other embodiments of the present invention will become apparent to one skilled in the art from reference to the description of the present invention. It is therefore contemplated that the appended claims will cover any such modifications or embodiments as fall within the true scope of the invention.

What is claimed is:

1. A semiconductor integrated circuit, comprising:
a bridge circuit which controls a bus line, wherein the bus line includes a first main bus line having a first end connected to the bridge circuit and having a second end opposite the first end, a second main bus line, a first branch bus line connected to the first main bus line, and a second branch bus line connected to the second main bus line;

a first control circuit, connected to the second end of the first main bus line and an end of the second main bus line, and that receives a select signal and transfers a data from the first main bus line to the second main bus line in accordance with a logic state of the select signal; and a plurality of peripheral circuits which are connected to the first and second branch bus lines, wherein the first and second main bus lines and the first and second branch bus lines are address bus lines, and the data transferred are addresses of the peripheral circuits.

2. The semiconductor integrated circuit according to claim 1, wherein the first control circuit includes an AND circuit.

3. The semiconductor integrated circuit according to claim 1, wherein the first control circuit includes a latch circuit.

4. The semiconductor integrated circuit according to claim 1, further comprising:

second control circuits which are between the first and second main bus lines, and the peripheral circuits, and which are located at the first and second branch bus lines.

5. The semiconductor integrated circuit according to claim 4, wherein the second control circuits include AND circuits.

6. The semiconductor integrated circuit according to claim 4, wherein the second control circuits include latch circuits.

7. The semiconductor integrated circuit according to claim 4, wherein the first and second branch bus lines have a plurality of first sub-bus lines located between the first main bus line and the second main bus line, and the second control circuits, and a plurality of second sub-bus lines located between the second control circuits and the peripheral circuits, wherein the second sub-bus lines are longer than the first sub-bus lines.

8. The semiconductor integrated circuit according to claim 7, wherein the second sub-bus line leading to one of the peripheral circuits which is located closest to the bridge circuit is the widest of all the second sub-bus lines, and wherein the second sub-bus line leading to one of the peripheral circuits which is located farthest from the bridge circuit is the most narrow of all the second sub-bus lines.

9. The semiconductor integrated circuit according to claim 7, wherein the second sub-bus line leading to one of the peripheral circuits which is located closest to the bridge circuit has a bit width greater than bit widths of all other ones of the second sub-bus lines, and wherein the second sub-bus line leading to one of the peripheral circuits which is located farthest from the bridge circuit has a bit width smaller than the bit widths of all the other second sub-bus lines.

10. A semiconductor integrated circuit, comprising:

a bridge circuit which controls a bus line, wherein the bus line includes a first main bus line having a first end connected to the bridge circuit and having a second end opposite the first end, a second main bus line, a first branch bus line connected to the first main bus line, and a second branch bus line connected to the second main bus line;

a plurality of peripheral circuits which are connected to the first and second branch bus lines; and a first control circuit, connected to the second end of the first main bus line and an end of the second main bus line, and that receives a select signal and selectively disconnects the peripheral circuits along the second branch bus line from the first main bus line by disabling transfer of data between the first main bus line and the second main bus line in accordance with a logic state of the select signal.

11. The semiconductor integrated circuit according to claim 10, wherein the first control circuit includes an AND circuit.

12. The semiconductor integrated circuit according to claim 10, wherein the first control circuit includes a latch circuit.

13. The semiconductor integrated circuit according to claim 10, further comprising:

second control circuits which are between the first and second main bus lines, and the peripheral circuits, and which are located at the first and second branch bus lines.

14. The semiconductor integrated circuit according to claim 13, wherein the second control circuits include AND circuits.

15. The semiconductor integrated circuit according to claim 13, wherein the second control circuits include latch circuits.

16. The semiconductor integrated circuit according to claim 13, wherein the first and second branch bus lines have a plurality of first sub-bus lines located between the first main bus line and the second main bus line, and the second control circuits, and a plurality of second sub-bus lines located between the second control circuits and the peripheral circuits, wherein the second sub-bus lines are longer than the first sub-bus lines.

17. The semiconductor integrated circuit according to claim 16, wherein the second sub-bus line leading to one of the peripheral circuits which is located closest to the bridge circuit is the widest of all the second sub-bus lines, and wherein the second sub-bus line leading to one of the peripheral circuits which is located farthest from the bridge circuit is the most narrow of all the second sub-bus lines.

18. The semiconductor integrated circuit according to claim 16, wherein the second sub-bus line leading to one of the peripheral circuits which is located closest to the bridge circuit has a bit width greater than bit widths of all other ones of the second sub-bus lines, and wherein the second sub-bus line leading to one of the peripheral circuits which is located farthest from the bridge circuit has a bit width smaller than the bit widths of all the other second sub-bus lines.

19. The semiconductor integrated circuit according to claim 10, wherein the first and second main bus lines and the first and second branch bus lines are address bus lines.

* * * * *